United States Patent Office 3,705,841
Patented Dec. 12, 1972

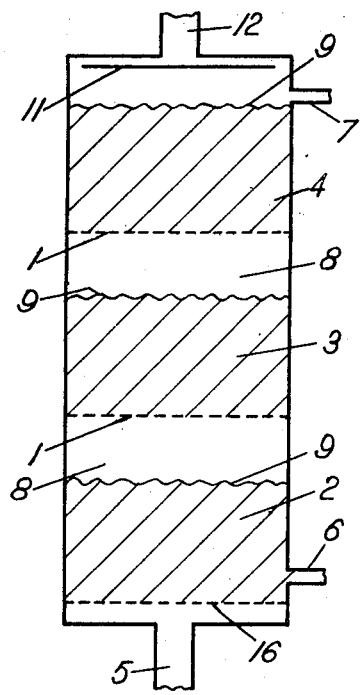
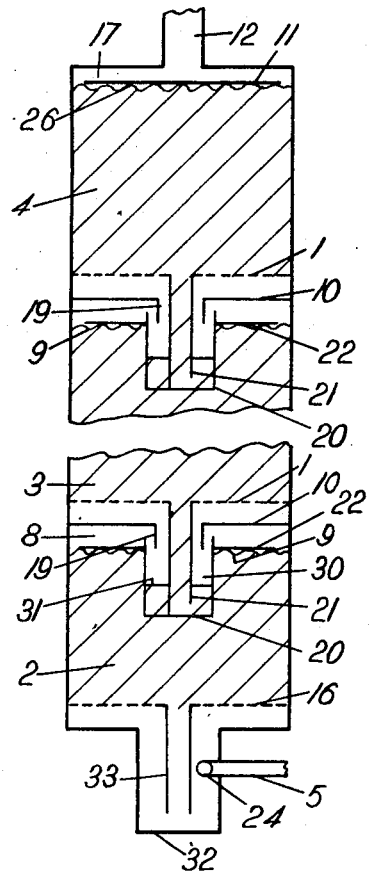
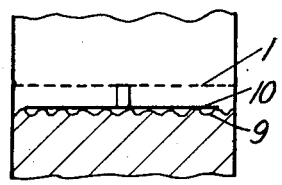
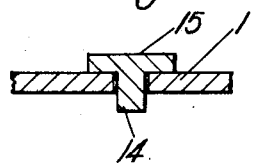

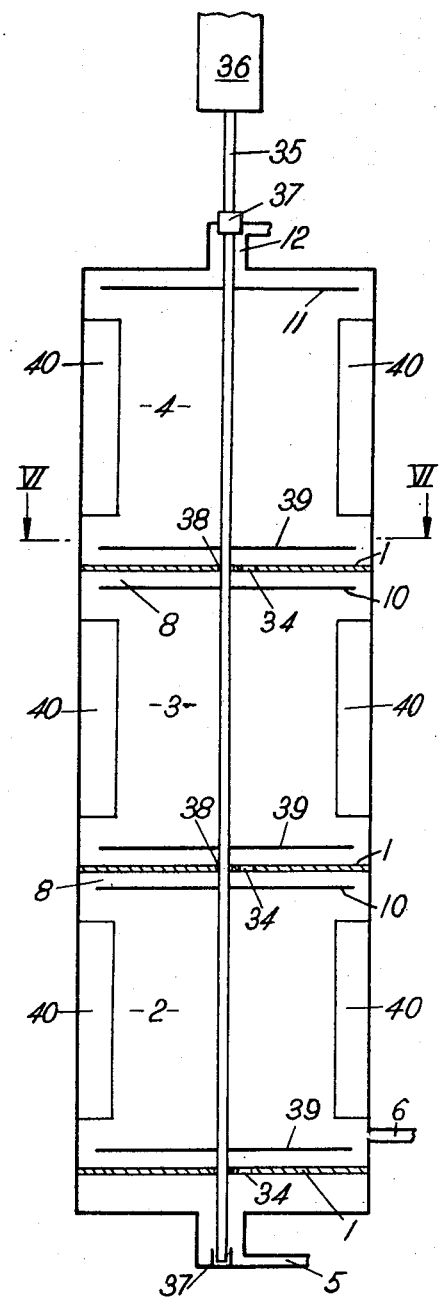
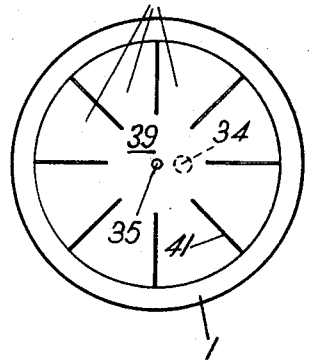

3,705,841
FERMENTATION PROCESSES AND APPARATUS
Melvyn Lumb, Peter Edward Macey, Richard Donald Wright, and Roy Kenneth Petchell, Nottingham, England, assignors to Boots Pure Drug Company Limited, Nottingham, England
Filed Dec. 8, 1967, Ser. No. 689,019
Claims priority, application Great Britain, Dec. 9, 1966, 55,329/66
Int. Cl. C12b *1/00;* C12d *9/14*
U.S. Cl. 195—80 R
11 Claims

ABSTRACT OF THE DISCLOSURE

A continuous fermentation process for the cultivation of living cells which consists of the steps of continuously supplying a stream of gas and a supply of fermentable liquid to the first of a plurality of interconnected fermentation zones containing living cells capable of fermenting said fermentable liquid, said plurality of fermentation zones being interconnected through partition members defining interconnections which allow only a restricted flow of said gas therethrough, flowing said stream of gas upwards through each of said plurality of fermentation zones in the same direction as the flow of said fermentable liquid and thereafter to the bottom of the next adjacent fermentation zone, whereby products of fermentation are formed in said plurality of fermentation zones, withdrawing said stream of gas and said fermentable liquid containing said products of fermentation from the last of said plurality of fermentation zones, said restricted flow of gas between said interconnected fermentation zones forming a gas pocket in the upper part of each of said fermentation zones thus causing the liquid phase in said interconnected fermentation zones to be discontinuous from one zone to the next, said restricted flow of said gas being sufficient to transfer said fermentable liquid and products of fermentation by entrainment from the top of each of said fermentation zones to the bottom of the next adjacent fermentation zone.

---

In this specification a fermentation process is defined as a process which involves the growth of living cells in nutrient media with the consequent breakdown of the nutrients, accompanied in some cases by the production of desirable organic compounds.

The advantages of continuous fermentation processes, in comparison with batch methods, are well recognised. Such advantages include increased productivity and the much smaller size of fermenter required for a given output of product.

Many publications have appeared concerning both aerobic and anaerobic continuous fermentation processes, and much attention has been drawn to the factors which affect the efficiency of such processes. For example, where the aim of a continuous aerobic fermentation process is the formation of a metabolic product, it is recognized that a multistage process, i.e. a process involving a plurality of successive separate fermentation zones, has a number of advantages compared with a single stage process utilising one fermentation zone.

One advantage is the narrower distribution of residence times of both the microbial cells and portions of the substrate in the system, which has a favourable effect on the efficiency of the conversion of substrate to the desired metabolic product. Another advantage is that it is possible to provide different environmental conditions in successive fermentation zones. This is an advantage since many microorganisms have a product formation stage subsequent to their growth stage, and the optimum environmental conditions for each stage are often different. Many of the microorganisms utilised in industrially important fermentation processes, for example antibiotic production and steroid conversion processes, are of this type. Environmental conditions that may differ in successive fermentation zones are, for example, temperature, pH value, nutrient composition, and substrate and product concentration.

There are however considerable practical difficulties associated with the operation of multistage fermentation processes. Such difficulties include the prevention of contamination by foreign microorganisms, the maintenance of adequate flow from one stage to the next, the prevention of back-mixing, and the maintenance of the microorganism, as it is transferred from one stage to the next, in an optimum physiological state for the desired microbiological conversion. Difficulties associated with the transfer of the microorganism from one stage to the next are particularly acute when the fermentation process involves the cultivation of filamentous microorganisms. Fermentation processes that involve the cultivation of filamentous microorganisms are of course extremely important; many industrial fermentation processes, for example antibiotic production and steroid conversion processes, are of this type.

It is an object of the present invention to provide a multistage fermentation process which minimizes or obviates the above-mentioned practical difficulties. It is a further object of the invention to provide such a process which can be operated utilising filamentous microorganisms. It is a further object of the invention to provide apparatus in which such a process may be carried out.

According to the present invention there is provided a continuous fermentation process which comprises the cultivation of living cells in a system which consists of a plurality of compartments connected in series, fermentable liquid being supplied to the first compartment and products of fermentation being withdrawn from the last compartment, a stream of gas flowing upwards through each compartemnt and from the top of one compartment to the bottom of the next in the same direction as the flow of liquid undergoing fermentation, the upper part of each compartment being connected to the lower part of that compartment next in line in the direction of flow of the contents of the system through a partition member adapted to allow but restrict the flow of gas whereby a gas pocket is maintained in the upper part of each compartment thereby rendering the liquid phase in the system discontinuous from one compartment to the next, the cells and liquid undergoing fermentation being transferred through each gas pocket by entrainment in the stream of gas.

The term "continuous fermentation process" as used in this specification sigifies a fermentation process in which the supply of fermentable liquid to a fermentation apparatus and the withdrawal of products of fermentation from the apparatus is continuous, or is periodic over a prolonged period, the intervals between flow being relatively short in comparison with the prolonged period of operation.

The process of the present invention may be effected in various ways. For example, the process may be operated using a system comprising a plurality of compartments situated side by side, the upper part of each compartment being connected to the lower part of that compartment next in line in the intended direction of flow of the contents of the system for the transfer of gas, cells and liquid undergoing fermentation from one compartment to the next. Such a system may comprise, for example, a multi-compartment elongate vessel, for example an elongate cylinder, mounted with its longitudinal axis substantially horizontal.

However, according to a preferred aspect of the invention there is provided a continuous fermentation process which comprises the cultivation of living cells in a vessel divided by partition members into a plurality of substantially vertically super-imposed compartments, fermentable liquid being supplied to a lower compartment and products of fermentation being withdrawn from an upper compartment, a stream of gas flowing upwards through the vessel, the partition members being adapted to allow but restrict the flow of gas whereby a pocket of the gas is maintained in the upper part of each compartment thereby rendering the liquid phase in the vessel discontinuous from one compartment to the next, cells and liquid undergoing fermentation being transferred through each gas pocket by entrainment in the stream of gas.

It will be appreciated that by the term "products of fermentation" we mean one or more of those materials produced by the living cells fermenting the fermentable liquid, and that therefore this term includes living cells in addition to chemical products.

The process of the invention may be used for a variety of purposes, among which, by way of non-limiting examples only, there may be mentioned (a) the production of metabolic products, either within the cells of microorganisms or in the fermentable liquid, which it is desired to produce and isolate as marketable products, e.g. antibiotics, alcohol, beer, (b) the production of metabolic products, either within the cells of microorganisms or in the fermentable liquid, which it is desired to produce in order to utilise them in subsequent or contemporaneous chemical conversions, e.g. enzymes for steroid conversions, (c) the growth of cells which may be microbial cells e.g. food yeast, or tissue cells e.g. animal tissue cells for the purpose of vaccine production, and (d) the removal of a component or number of components from a multi-component fermentatable liquid in order to produce a liquid containing a reduced concentration of said removed components e.g. purification of petroleum hydrocarbons.

An important group of industrial fermentation processes utilise aerobic microorganisms, e.g. antibiotics production and steroid conversions, and for the purpose of more fully describing the present invention and methods by which it may be performed, further description in this specification will be largely confined to processes of the type hereinbefore defined in which the living cells are those of an aerobic microorganism and the gas is an oxygen-containing gas. This is for the purpose of clarity and brevity only, and is not intended to be limiting. Methods of utilising the process of the present invention with anaerobic microorganisms and gas containing no oxygen or with tissue cells and a suitable gas will be apparent to those skilled in the art from a study of the description given hereafter. For example, one feature of the processes hereinafter to be described is the use of an oxygen-containing gas introduced into the first compartment of the system, and this feature might be dispensed with in certain operations in which a sufficient quantity of gas is produced in the first compartment by a microorganism fermenting the fermentable liquid, so that no additional gas is required to be introduced into the first compartment. Similarly, other variations of the processes more fully described hereafter, which utilise the basic inventive idea of the present invention, will become evident to those skilled in the art.

A preferred continuous fermentation process according to the invention is one which comprises the aerobic cultivation of a microorganism in a system which consists of a plurality of compartments connected in series, fermentable liquid being supplied to the first compartment and products of fermentation being withdrawn from the last compartment, the microorganism being aerated by a stream of oxygen-containing gas which enters the first compartment, flows upwards through each compartment and flows from the top of one compartment to the bottom of the next in the same direction as the flow of liquid undergoing fermentation, the upper part of each compartment being connected to the lower part of that compartment next in line in the direction of flow of the contents of the system through a partition member adapted to allow but restrict the flow of oxygen-containing gas whereby a gas pocket is maintained in the upper part of each compartment thereby rendering the liquid phase in the system discontinuous from one compartment to the next, microbial cells and liquid undergoing fermentation being transferred through each gas pocket by entrainment in the stream of oxygen-containing gas.

However, according to a preferred aspect of this embodiment of the invention there is provided a continuous fermentation process which comprises the aerobic cultivation of a microorganism in a vessel divided by partition members into a plurality of substantially vertically super-imposed compartments, fermentable liquid being supplied to a lower compartment and products of fermentation being withdrawn from an upper compartment, the microorganism being aerated by a stream of oxygen-containing gas which enters the bottom of the vessel and flows upwards through the vessel, the partition members being adapted to allow but restrict the flow of oxygen-containing gas whereby a pocket of such gas is maintained in the upper part of each compartment thereby rendering the liquid phase in the vessel discontinuous from one compartment to the next, microbial cells and liquid undergoing fermentation being transferred through each gas pocket by entrainment in the stream of oxygen-containing gas.

It will be appreciated that in operating the process of the invention, it may be desirable in some circumstances to make additions to, or withdrawals from, a compartment or compartments intermediate the first (to which fermentable liquid is being supplied) and the last (from which products of fermentation are being withdrawn). Thus for example it may be desirable to make additions in this manner of oxygen-containing gas, supplementary nutrients, precursors, substrates, antifoam agents, etc.

The specific manner of operating the process of the invention will clearly depend to a large extent upon the nature and the characteristics of growth of the living cells which it is desired to use. The selection of the exact mode of operation and of the operating values for many of the variable factors e.g. composition of fermentable liquid, rate of introduction of fermentable liquid, temperature, pH, rate of flow of gas, size of apparatus used, nature of the partition members, and so on, must, because of the very nature of fermentation processes, be largely empirical. The selection will of course be influenced by knowledge derived from known fermentation processes, especially by knowledge derived from the well-established batch processes.

It is clearly impossible to describe fully in this patent specification all the details of all the embodiments of the present invention, but certain embodiments will be more fully described with the aid of the accompanying drawings. For the reasons stated earlier, description will be limited to a typical process of the invention involving the growth of an aerobic microorganism using an oxygen-containing gas. Reference will be made to the use of air as the required oxygen-containing gas, but it will of course be appreciated that other oxygen-containing gases, for example oxygen-enriched air, may be used in place of air. Thus the term "air" as used hereinafter, apart from in the example and unless otherwise stated, designates an oxygen-containing gas.

In the drawings:

FIG. 1 is a schematic vertical cross section through an elongated cylindrical fermentation column, mounted with its axis vertical, for use in the invention.

FIG. 2 is a similar cross section of a modified form of part of the column shown in FIG. 1.

FIG. 3 is a similar cross section of another modified partition member for use in the column shown in FIG. 1.

FIG. 4 is a schematic vertical cross section of another fermentation column.

FIG. 5 is a similar section of another column.

FIG. 6 is a section on the line VI—VI in FIG. 5.

The fermentation column shown in FIG. 1 is divided into three compartments 2, 3 and 4 by means of partition members 1, which are shown in the diagram as multi-perforated plates. However a multi-perforated plate is only one of a plurality of forms of partition member that may be used in accordance with the process of the present invention, as will be hereinafter explained. The fermenter is fitted with air inlet means 5 which may be covered, for example, with a sintered disc 16, an annular air sparger or a multiperforated plate. The fermenter is also fitted with inlet means 6 for the supply of fermentable liquid and outlet means 7 for the withdrawal of products of fermentation. Air exhaust means 12 is also provided, partially occluded by a baffle 11. Outlet means 7 may be omitted in some instances, and fermented product withdrawn through the air exhaust means 12.

The diagram shows the fermenter with liquid undergoing fermentation, represented by the shaded areas, in each compartment. The partition members 1 restrict the flow of air from one compartment to the next, with the result that air pockets 8 are formed beneath the partition members. The flow of air through each compartment causes turbulence to occur at the liquid surfaces 9, with the result that microbial cells and liquid undergoing fermentation are entrained in the air stream and carried through the air pockets and are thus transferred from one compartment to the next.

It will be appreciated that the degree of air restriction required to be caused by the partition members will depend, at least in part, upon the desired rate of air flow. It will also be appreciated that the fermenter in FIG. 1 is shown with three compartments for purposes of illustration; fermenters for use in accordance with the present invention may have any desired number of compartments.

It is often desirable, in order to ensure adequate aeration of the microorganism in all compartments, to use rates of air flow which are high enough to cause considerable turbulence at the liquid levels in each compartment with the result that the air pockets formed would be relatively large and would comprise, for example up to about 50% of the space in each compartment of the column of FIG. 1. The space occupied by the air pockets is of course unproductive space as far as the actual fermentation process is concerned. We have found that the provision of a baffle, for example a substantially horizontal baffle plate, fitted on the inlet side of the partition member, for example beneath the partition member and adjacent to it, reduces the above-mentioned turbulence with a consequent advantageous reduction in the space occupied by the air pockets.

A suitable baffle for use in the fermenter shown in FIG. 1 is illustrated in FIG. 2. Thus, a baffle 10 which takes the form of a circular disc of diameter less than that of the fermentation column is attached to the perforated plate partition member 1. Incorporation of the baffle results in the formation of a turbulent liquid level 9 situated just below the baffle plate.

Although for purposes of illustration the hereinbefore described partition members have taken the form of simple multi-perforated plates, there are many other types of partition member which may be used in accordance with the process of the present invention. Thus, for example, a suitable partition member may comprise a multi-perforated plate, or a plate with a single perforation. Such perforations may take the form of slots or circular holes and the perforations may be fitted with non-return valves. Such a valve may comprise, for example, a weight which is lifted into its open position by the pressure of air beneath it. It may be a mushroom-shaped valve 14 fitted into the plate 1, as shown in FIG. 3, or it may comprise a weight which is slidably mounted on a substantially vertical spigot; for example the valve may comprise a cylindrical weight which is slidably mounted on a substantially vertical spigot which passes through a hole formed along the longitudinal axis of the weight. The valve 14 is of course opened by the stream of air flowing upwards through the partition member. The valve 14 has a head 15 which may be of substantial diameter so that increased distribution of air is achieved.

One factor which influences the design of a suitable partition member is whether or not the fermentation compartments are provided with any agitation additional to that provided by the upward flow of air, e.g. stirring. If the fermentation compartments are subjected to additional agitation, a partition member comprising a plate having only a few appropriately sized apertures, or even a single appropriately sized aperture, may be suitable. On the other hand, if the fermentation compartments are not subjected to additional agitation it may be advisable to use a partition member adapted to distribute the air uniformly over the whole cross section of the next fermentation compartment, in order to ensure adequate aeration of the micro-organism. Such a partition member may be a multi apertured plate or a sintered plate.

In some circumstances it may be advantageous to use a partition member adapted to separate the gas phase, for example air, from the entrained micro-organism-containing liquid phase before these phases enter a fermentation compartment after being transferred through the previously mentioned air pocket. Such a partition member is illustrated in FIG. 4 which depicts one form of multi-compartment fermentation apparatus suitable for use in accordance with the present invention. The column is divided into a plurality of compartments, for example up to 10 compartments, although only the first compartment 2 and last compartment 4 are shown completely and part of the second compartment 3 is shown. Each partition member comprises a multi-apertured plate 1. Each multi-apertured plate 1 is partially occluded by a baffle member 10 fitted beneath it. Each baffle has a duct 19 fitted to it and leading down from its centre and projecting downwards into a vessel 20. Each duct terminates in the upper part of the vessel 20 into which it leads. The lower part of the interior of the vessel 20 is connected to the next higher compartment by a central duct 21 which passes up inside the duct 19, the duct 21 having a diameter substantially less than that of the duct 19. A second baffle 22 is fitted beneath and spaced from baffle 10.

Means are provided for regulating the temperature of the contents of each compartment and means are also provided for making additions to, or withdrawals from, each compartment, but these are not shown in the diagram.

Air and fermentable liquid are fed into the column through an inlet pipe 5 which has a tangential inlet 24. Used air together with entrained products of fermentation leave the top compartment by means of a pipe outlet 12. There is a baffle 11 beneah the pipe outlet and this serves to reduce the turbulence at the liquid level in compartment 4. The baffle results in the formation of a turbulent liquid level 26 just below it and an air pocket 17 above it, and as a result of the reduction in turbulence reduces the volume of space occupied by the air pocket 17.

Transfer of air, liquid and micro-organism from one compartment to the next will now be described with reference to the transfer of material from compartment 2 to compartment 3, the shaded areas in these compartments representing liquid undergoing fermentation. The multi-perforated plate 1 restricts the flow of air from compartment 2 to compartment 3, with the result that an air pocket 8 is formed. A turbulent liquid level 9 is formed just below the baffle 11 as hereinbefore explained. Liquid containing microbial cells is entrained in the air stream and carried through the air pocket 8 to a region 30 in the vessel 20 where the gas (air) phase separates from the liquid phase containing microbial cells. Air passes up through the duct 19 and is then distributed by the multi-perforated plate 1 over the whole cross section of the bottom of compartment 3. Liquid undergoing fermentation and microbial cells travel via the duct 21 and thence into compartment 3. It may be advantageous to fit a valve, for example a valve of the type hereinbefore described, into the top of the duct 21, in order to minimise oscillation of the liquid level 31 in the vessel 20 and prevent a "blow through" of liquid in the vessel 20 and duct 21 into the compartment above. It will be appreciated that the vessel 20 acts as a liquid trap. One advantage of the separation of the gas and microbial cell-containing liquid phases as described above is that the microbial cells and any solid components which might be present in the liquid undergoing fermentation, for example nutrient substances, are not transferred through the small apertures in the plates 1. This reduces the risk of blockage of the apertures in the plates 1. Such an arrangement may be advantageous when pilot scale equipment is being operated, since the apertures in the plates 1 will necessarily be small. Such an arrangement is of course necessary if it is desired to use a partition member comprising a sintered plate.

The vessel 32 acts as a liquid trap in the same way as the vessel 20, so that fermentable liquid including any solid components which may be present, is fed into compartment 2 via a duct 33 whereas the necessary air enters compartment 2 via the multi-perforated plate 16.

The column shown in FIG. 5 includes one form of partition member in combination with a gas distribution device, which combination allows very satisfactory transfer of cells and liquid from one compartment to the next by entrainment in the gas stream and also provides for very efficient aeration of the contents of each compartment with minimum use of power. The column is divided into three compartments 2, 3 and 4 with partition members 1 each of which comprises a plate containing a single aperture 34. The column is provided with an outlet 12 for used air and products of fermentation, and inlets 5 and 6 for the introduction of air and fermentable liquid respectively. A rotatable shaft 35 powered by motor 36 passes down the longitudinal axis of the column through bearings and seals 37, and through bearings or holes 38 in the centres of plates 1. The shaft also passes through and is fixed to circular baffle plates 10 which are positioned beneath the partition plates 1 and partially occlude them, and to a circular baffle plate 11 which is posititoned beneath outlet 12 and partially occludes it. The shaft addtionally passes through and is fixed to circular air distributing plates 39 which contain radial slots 41 as shown in FIG. 6. Baffles 40 are provided parallel to the longitudinal axis of the column. Means are provided for regulating the temperature of the contents of each compartment and means are also provided for making additions to, or withdrawals from, each compartment, but for the sake of simplicity these are not shown in the diagram.

As shown in FIG. 6, each of the air distribution plates 39 is attached to the shaft 35 and is provided with radial slots 41 extending inwardly from its periphery, which divide the plate into sectors 42. One or more of the sectors 42 may be angled or pitched.

For the reasons previously described, operation of the column of FIG. 5 with introduction of air through inlet 5 and fermentable liquid through inlet 6 leads to the formation of gas pockets in spaces 8 and turbulent liquid surfaces below the baffle plates 10. Air with entrained microbial cells and liquid is forced upwards through apertures 34. This air emerges in bubbles from the periphery of the air distributing plates 39, the rotation of which causes very efficent aeration of the contents of the compartment above it. Baffle plates 40 prevent the entire column of liquid revolving with formation of a vortex through which air could pass upwards easily with no aeration of the liquid. Rotation of the baffle plates 10 and 11 minimises foaming.

The design of the particular apparatus to be used for a particular continuous fermentation process will depend to a large extent on the growth characteristics of the cells which are to be used. Thus, for some cells, a muti-apertured partition plate with many small apertures may be satisfactory whereas for other cells these small holes may be too easily blocked and the use of a partition plate with a single comparatively large aperture may give better results. As stated earlier, the degree of gas restriction required to be caused by the partition members will depend in part upon the desired rate of gas flow, as well as of course upon other factors such as the dimensions of the column when the preferred vertically superimposed compartments are used. In many instances we have found that the total cross-sectional area of the aperture or apertures in the partition members should be less than about 1.4% of the cross-sectional area of the members, calculated with respect to unperforated members. In many apparatus designs, this value may be less than 0.5% or less than 0.1%. Suitable gas flow rates may be of the order of 0.1–3 volumes per minute, the term "volume" referring to the total volume of the fermentation compartments in the apparatus, but lower or higher flow rates may be practicable in some instances. Thus for example we have used an air flow rate of 50 litres per minute in a five compartment vertical column similar to that of FIG. 5 of height 5 ft. and diameter 9 in., with single $\frac{3}{16}$ in. diameter apertured partition members for the preparation of neomycin using *Streptomyces fradiae;* in this case the cross-sectional area of the aperture is 0.04% of the partition member area.

In order to minimise the possibility of back-flow of the liquid in vertical columns of the type illustrated in FIGS. 1, 4 and 5, it is advantageous to make the aperture or apetrures in the partition members in the form of tubes rather than of holes in thin plates. Such tubular apertures should preferably have their length greater than their bore; they should preferably have a ratio of length to diameter greater than about 2:1, and more preferably greater than about 5:1 for some conditions. It may also be desirable in some cases to fit non-return valves into the top of the tubular apertures, such as valves of the type hereinbefore mentioned. The main point is that the relationship between the gas flow rate and the size and design of the aperture or apertures in the partition members should be such that uniflow characteristics are maintained viz there is forward flow of gas through the apertures but no backward flow of liquid from one compartment to the next.

We have observed that when the process of the invention is used to cultivate some types of living cells, such cells are transferred from one compartment to the next less readily than the liquid undergoing fermentation. This leads to the formation of a cell density gradient through the fermentation apparatus, the first compartment having the highest cell density. As a result of the differential transfer rates of liquid undergoing fermentation and cells, the cells have a longer residence time in the system than the liquid undergoing fermentation. Such a difference in residence times is advantageous since it generally results in an increase in the volumetric efficiency of the fermentation process, i.e. the rate of output of product for a given volume of fermenter.

Apparatus suitable for carrying out the described continuous fermentation processes forms a further feature of our invention. The apparatus may be a fermentation tower suitable for carrying out continuous fermentation processes therein when positioned with it's longitudinal axis substantially vertical and which comprises an elongate tower provided with inlet means for introducing fermentable liquid at or near one end of the tower and outlet means for the withdrawal of products of fermentation at or near the other end of the tower, and divided into a plurality of compartments connected in series, the outlet end of each compartment being connected to the inlet end of the compartment adjacent in the direction of flow through a partition member fixed within the tower in a plane substantially transverse to the longitudinal axis of the tower adapted to allow but restrict gas flow through the tower in the direction from inlet means to outlet means, each of said partition members being partially occluded by a baffle plate fitted on the inlet side in a plane substantially transverse to the longitudinal axis of the tower.

This tower may be combined with one or more of the following additional features:

(1) A gas inlet means may be provided at or near the same end as the fermentable liquid inlet means, or may be incorporated into said fermentable liquid inlet means;

(2) Means for making additions to or withdrawals from later compartments in the series may be provided;

(3) Means for controlling the temperature of the contents of the tower may be provided;

(4) The partition members may be adapted to distribute the flow of gas over the cross section of the tower. Ways of carrying this out include:

(a) Providing the partition members with multiple perforations;

(b) Providing the partition members with gas distribution means additional to the aperture or apertures therein; thus for example a mushroom valve of the type hereinbefore described with a head of a substantial diameter may be fitted into the aperture;

(5) The aperture or apertures in the partition members may be in the form of a tube or tubes with length to diameter ratio greater than about 2:1, or greater than about 5:1;

(6) Gas distribution means adapted to distribute the flow of gas over the cross section of the tower may be provided on the outlet side of the partition members; this may take the form of a stirrer or of a rotatable plate of the type hereinbefore described;

(7) The baffle plates on the inlet side of the partition members may be adapted for rotation;

(8) In the case of each partition members the total cross sectional area of the aperture or apertures may be less than 1.4% of the cross sectional area of the partition member, calculated with respect to an unperforated member; this percentage may be less than 0.5% or less than 0.1% in some cases;

(9) Baffles may be provided within the compartments in a plane substantially parallel to the longitudinal axis of the tower;

(10) The apertures in the partition members may be fitted with non-return valves to prevent liquid flow in the direction from outlet means to inlet means;

(11) The partition members may be adapted to separate a gas phase from entrained cells and liquid, for example by means of the device hereinbefore described with reference to FIG. 4.

According to a further feature of the invention there is provided a fermentation tower suitable for carrying out continuous fermentation processes therein when positioned with its longitudinal axis substantially vertical which comprises an elongate tower provided with inlet means for introducing fermentable liquid at or near one end of the tower and outlet means for the withdrawal of products of fermentation at or near the other end of the tower, and divided into a plurality of compartments connected in series, the outlet end of each compartment being connected to the inlet end of the compartment adjacent in the direction of flow through a partition member fixed within the tower in a plane substantially transverse to the longitudinal axis of the tower and adapted to allow but restrict gas flow through the tower in the direction from inlet means to outlet means, each of said partition members containing at least one aperture in the form of a tube with a length to diameter ratio at least 2:1, or at least 5:1, the total cross sectional area of the aperture or apertures being less than about 1.4%, or about 0.5%, or about 0.1%, of the cross sectional area of the partition member calculated with respect to an unperforated member.

This feature of the invention may be combined with previously mentioned combination features, e.g. numbers 1, 2, 3, 4, 6, 7, 9, 10 and 11 of those listed above.

The following non-limitative examples illustrate the invention.

EXAMPLE 1

A fermentation vessel of the type illustrated in FIG. 4 was used. The vessel comprises a vertically mounted cylindrical glass column of diameter 22.8 cm. (all diameters quoted are expressed as internal measurements). The column was divided into 5 fermentation compartments by means of the partition members illustrated in FIG. 4, the vertical distance between the plates 1 being 21.6 cm. The total volume of the 5 compartments was about 35 litres. Each circular plate 1 had a thickness of 0.32 cm., and was perforated by 42 uniformly distributed circular holes of 0.226 cm. diameter. The duct 21 took the form of the a tube of length 10 cm. and diameter 1 cm., and had a slot 1.3 cm. high and 0.65 cm. wide adjacent to the bottom of the vessel 20. The vessel 20 was cylindrical, of length 8.25 cm. and diameter 3.8 cm. The duct 19 was cylindrical, of length 2.0 cm. and diameter 2.5 cm. The baffle 22 was an annular plate extending to within 1.3 cm. of the column wall. The vertical distance between the baffle plate 22 and the baffle plate 10 and 1.3 cm. The vertical distance between the plate 10 and the perforated plate 1 was also 1.3 cm. The plate 16 was perforated as described above for the plates 1. The duct 33 took the form of a tube of length 9.5 cm. and diameter 1 cm., extending to within 0.6 cm. of the bottom of the vessel 32 which was a cylinder of length 9 cm. and diameter 5 cm. The inlet pipe 5 and tangential inlet 24 both had a diameter of 1.3 cm. The baffle 11 was a circular disc of thickness 0.32 cm., extending to within 1.3 cm. of the column wall. The outlet pipe 12 had a diameter of 1.3 cm. The first compartment (compartment 2) was fitted with a 500 watt rheostat-controlled immersion heater whereby the contents of all 5 compartments were kept at 30° C. The perforated plates 1 and 16, the vessels 32 and 20, and the associated ducts and baffles were constructed of aluminium.

The apparatus was sterilised with steam and the first compartment was half filled with a sterile nutrient tap water medium containing 7.5% w./v. glucose, 0.5% w./v. dried yeast, 5% w./v. soya flour, 0.2% w./v. $CaCO_3$, 0.5% w./v. NaCl, 0.16% w./v. lard oil, and 0.05% w./v. Ucon LB 625 (antifoam), pH 6.5. Sterile air was passed through the inlet 5 at a flow rate of about 25 litres/minute and the compartment 2 was then inoculated via the inlet 5 with 400 mls. of a 48 hour vegetative inoculum of *Streptomyces fradiae*. Sterile nutrient medium was fed into the air stream in the inlet 5 at a rate of 220 ml./hr., and this flow rate of medium was maintained until the end of the fermentation. As the volume of liquid in the apparatus increased the air flow rate was gradually raised so that by the time each compartment contained liquid up to the level of the baffle plates 22, the air flow rate was 50 litres/minute.

Samples of fermentation brew were taken from each compartment at 24-hour intervals and assayed for neomycin titre. The results obtained after 16–22 24-hour periods of operation are given in the following table.

| | Neomycin titre (mcg./g.) in compartment | | | | |
|---|---|---|---|---|---|
| | 1st | 2d | 3d | 4th | 5th |
| No. of 24-hr. periods: | | | | | |
| 16 | 214 | 416 | 1,050 | 1,150 | 1,220 |
| 17 | | 772 | 1,350 | 1,350 | 1,980 |
| 18 | 375 | 864 | 1,155 | 1,425 | 1,725 |
| 19 | 175 | 536 | 1,150 | 1,205 | 1,670 |
| 20 | 220 | 405 | 1,145 | 1,250 | 1,575 |
| 21 | 124 | 338 | 975 | 950 | 1,575 |
| 22 | 142 | 280 | 925 | 960 | 1,225 |

The neomycin titre in the fifth compartment remained at a level of 1,000–1,200 mcg./g. for a further seven 24-hour periods, after which the titre started to drop and the experiment was discontinued.

EXAMPLE 2

A fermentation vessel of the type illustrated in FIG. 4 was used. The vessel comprises a vertically mounted cylindrical glass column of internal diameter 22.8 cm. The column was divided into five fermentation compartments by means of the partition members illustrated in FIG. 4, the vertical distance between the plates 1 being 30.5 cm. The total volume of the five compartments was about 50 litres. Each circular plate 1 had a thickness of 0.32 cm., and was perforated by 42 uniformly distributed circular holes of 0.226 cm. diameter. The duct 21 took the form of a tube of length 10 cm. and diameter 1 cm., and had a slot 1.3 cm. high and 0.65 cm. wide adjacent to the bottom of the vessel 20. The vessel 20 was cylindrical, of length 8.25 cm. and diameter 3.8 cm. The duct 19 was cylindrical, of length 2.0 cm. and diameter 2.5 cm. The baffle 22 was an annular plate extending to within 1.3 cm. of the column wall. The vertical distance between the baffle plate 22 and the baffle plate 10 was 1.3 cm. The vertical distance between the plate 10 and the perforated plate 1 was also 1.3 cm. The plate 16 was perforated as described above for the plates 1. The duct 33 took the form of a tube of length 9.5 cm. and diameter 1 cm., extending to within 0.6 cm. of the bottom of the vessel 32 which was a cylinder of length 9 cm. and diameter 5 cm. The inlet pipe 5 and tangential inlet 24 both had a diameter of 1.3 cm. The baffle 11 was a circular disc of thickness 0.32 cm., extending to within 1.3 cm. of the column wall. The outlet pipe 12 had a diameter of 1.3 cm. The first compartment (compartment 2) was fitted with a 500 watt rheostat-controlled immersion heater whereby the contents of all five compartments were kept at 30° C. The perforated plates 1 and 16, the vessels 20 and 32, and the associated ducts and baffles were constructed of aluminium.

The apparatus was sterilised with steam and the first compartment was half filled with a sterile nutrient tap water medium containing 5.0% w./v. starch, 0.8% w./v. succinic acid, 0.65% w./v. $(NH_4)_2SO_4$, 0.04% w./v. $KH_2PO_4$, 0.09% w./v. $MgSO_4 7H_2O$, 0.002% w./v. $ZnSO_4 7H_2O$, 0.001% w./v. $MnCl_2$ and 0.001% w./v. $FeSO_4 7H_2O$, pH 7.3. Sterile air was passed through the inlet 5 at a flow rate of about 40 litres/min. and compartment 2 was then inoculated with 1 litre of a 48 hour vegetative growth of *Streptomyces fradiae*. Sterile nutrient medium was fed into the air stream in the inlet 5 at a rate of 400 ml./hr. The air flow rate was increased to 50 litres/min. after two 24-hour periods, then to 80 litres/min. after a further four 24-hour periods, then to 90 liters/min. after a further two 24-hours periods, then to 100 litres/min. after a further one 24-hour period and then decreased to 50 litres/min. after a further three 24-hour periods at which rate it remained until the end of the fermentation.

The medium flow rate was maintained at 400 ml./hr. until seven 24-hour periods had elapsed when it was increased to 600 ml./hr.; after a further five 24-hour periods the medium was supplemented with 2% glucose; this flow rate and medium composition were then maintained until the end of the fermentation.

Samples of fermentation brew were taken from each compartment at 24-hour intervals and assayed for neomycin.

The results obtained after various 24-hour periods of operation are given below.

| | Neomycin titre (mcg./g.) in compartment | | | | |
|---|---|---|---|---|---|
| | 1st | 2d | 3d | 4th | 5th |
| No. of 24-hour periods: | | | | | |
| 9 | 560 | 1,400 | 1,825 | 1,550 | 1,825 |
| 11 | 199 | 1,100 | 1,500 | 1,588 | 2,000 |
| 13 | 80 | 550 | 1,200 | 1,375 | 1,875 |
| 15 | 58 | 215 | 750 | 1,250 | 1,300 |
| 17 | 82 | 170 | 962 | 1,312 | 1,325 |
| 19 | 19 | 193 | 525 | 1,075 | 1,475 |
| 21 | 13 | 265 | 600 | 987 | 1,137 |
| 23 | 120 | 540 | 870 | 1,300 | 1,250 |
| 25 | 275 | 1,095 | 1,525 | 1,600 | 1,425 |
| 27 | 245 | 850 | 1,700 | 1,825 | 1,800 |
| 29 | 178 | 787 | 1,625 | 1,862 | 1,925 |
| 31 | 590 | 1,450 | 1,450 | 2,350 | 2,200 |

EXAMPLE 3

A fermentation vessel of the type illustrated in FIG. 5 was used. The vessel comprises a vertically mounted cylindrical glass column of internal diameter 22.8 cms. The column was divided into five fermentation compartments by means of the partition members illustrated in FIG. 5, the vertical distance between the plates 1 being 30.5 cms. The total volume of the five compartments was about 50 litres. Each circular plate 1 had a thickness of 0.32 cm. The single aperture 34 was in the form of a tube 2.4 cms. long with internal diameter 0.48 cm. extending equally above and below the plate 1. The baffle plates 10 and 11 were 21 cms. in diameter and 0.075 cms. thick. The air distributing plates 39 were 21 cms. in diameter and 0.075 cm. thick with 16 radial slots 41, each 0.15 cms. wide, extending inwards for a distance of 5.4 cms. from the circumference. The baffle plates 10 were set 2.8 cms. below the plates 1 and the air distributing plates 39 were set 3 cms. above the plates 1. In this apparatus the vertical baffles 40 were set half way up each compartment parallel to a diameter but offset sufficiently to allow free rotation of the shaft 35, each baffle was 20 cms. wide and 3.5 cms. high. Temperature control was maintained by heat exchangers, through which water could be circulated, fitted in the first and fourth compartments. In this experiment the temperature was kept at 30° C.

The apparatus was sterilised with steam and the first compartment half filled with sterile medium of composition the same as in Example 2. Sterile air was passed in through inlet 5 at a rate of about 50 litres/min. and the shaft 35 was rotated at 200 r.p.m. which rates were maintained until the end of the experiment. This compartment was then inoculated with 1 litre of a 48 hour vegetative growth of *Streptomyces fradiae*. The medium flow rate into inlet 6 was started at 400 ml./hr. which rate was maintained throughout the experiment. After seven 24-hour periods a supplementary nutrient addition was started into the third compartment consisting of a sterile tap water solution containing 25.0% w./v. glucose, 3.25% w./v. $(NH_4)_2SO_4$, 0.2% $KH_2PO_4$, pH adjusted to 6.8; this was introduced at a rate of 33 ml./hr. After a further three 24-hour periods, the constituents of this supplementary nutrient were reduced by 50% the addition rate remaining at 33 ml./hr.; after a further four 24-hour periods a supplementary nutrient addition with the same composition was started into the fourth compartment at a rate of 33 ml./hr. These supplementary nutrient additions were maintained at this rate to the one end of the experiment.

Samples of fermentation brew were taken from each compartment at 24 hour intervals and assayed for neomycin. The results obtained after various 24 hour periods of operation are given below.

| No. of 24-hour periods: | Neomycin titre (mcg./g.) in compartment | | | | |
|---|---|---|---|---|---|
| | 1st | 2d | 3d | 4th | 5th |
| 6 | 670 | 1,079 | 1,947 | 2,130 | 1,958 |
| 8 | 692 | 1,336 | 1,730 | 1,972 | 1,965 |
| 10 | 514 | 1,256 | 1,496 | 1,952 | 1,936 |
| 12 | 616 | 1,232 | 1,763 | 2,469 | 2,605 |
| 14 | 742 | 1,263 | 1,970 | 2,770 | 2,517 |
| 16 | 662 | 1,495 | 2,260 | 2,550 | 2,595 |
| 18 | 497 | 1,200 | 1,978 | 2,377 | 2,557 |
| 20 | 420 | 962 | 1,878 | 2,465 | 2,635 |
| 22 | 342 | 905 | 1,609 | 2,036 | 2,380 |
| 24 | 330 | 807 | 1,307 | 1,976 | 2,244 |

With the medium described above a fermentation in a small scale conventional batch fermenter can produce a titre of neomycin of about 1750 mcg./g. every 8 days, which gives a productivity of 0.22 g./litre/24 hours.

In this example the productivity over a period of 20 days with a flow rate of 10 litres/24 hours is 0.51 g./litre/24 hours. Thus the increase in productivity of this apparatus over a conventional batch fermenter is 2.28 times.

EXAMPLE 4

An experiment to illustrate the process of the invention as applied to the continuous growth of *Curvularia prasadii* for the microbiological conversion of Compound "S" to hydrocortisone was carried out as follows:

A fermentation vessel of the type illustrated in FIG. 5 was used, the fittings being essentially the same as described under Example 3.

The apparatus was sterilised with steam and the first compartment was half filled with a sterile nutrient tap water medium containing 1.0% w./v. tryptone, 1.0% w./v. sucrose, 0.2% w./v. NaNO₃, 0.05% w./v. KCl, 0.05% w./v. $MgSO_4 7H_2O$ and 0.001% w./v. $FeSO_4 7H_2O$, pH 4.5. Sterile air was passed in through inlet 5 at 20 litres/min. and the shaft 35 rotated at 200 r.p.m. Compartment 2 (i.e. the first compartment) was then inoculated with 2 litres of a 24 hour vegetative growth of *Curvularia prasadii*. Sterile nutrient medium was fed into compartment 2 via inlet 6 at a rate of 1 litre/hour. The temperature of the fermentation was controlled at 26° C.

Samples of liquor were taken after three 24 hour periods from the 1st, 2nd and 3rd compartments and 100 ml. amounts transferred to sterile 500 ml. conical flasks. Compound "S" was added to the flasks at rate of 1,000 mcg./ml. as a solution in dimethylformamide. The flasks then placed in a shaker and sampled 24 hours after addition of the Compound "S" and assayed for hydrocortisone conversion.

| Compartment number | 1st | 2d | 3d |
|---|---|---|---|
| pH of sample withdrawn from compartment | 4.5 | 6.3 | 7.2 |
| Dry weight in sample withdrawn from compartment (mg./ml.) | 9.6 | 14.8 | 10.0 |
| Percent conversion to hydrocortisone | 8.9 | 28.9 | 38.9 |

Subsequent samples could not be taken owing to mechanical failure within the apparatus.

We claim:

1. A continuous fermentation process for the cultivation of living cells which consists of the steps of continuously supplying a stream of gas and a supply of fermentable liquid to the first of a plurality of interconnected fermentation zones containing living cells capable of fermenting said fermentable liquid, said plurality of fermentation zones being interconnected through partition members defining interconnections which allow only a restricted flow of said gas therethrough, flowing said stream of gas upwards through each of said plurality of fermentation zones in the same direction as the flow of said fermentable liquid and thereafter to the bottom of the next adjacent fermentation zone, whereby products of fermentation are formed in said plurality of fermentation zones, withdrawing said stream of gas and said fermentable liquid containing said products of fermentation from the last of said plurality of fermentation zones, said restricted flow of gas between said interconnected fermentation zones forming a gas pocket in the upper part of each of said fermentation zones thus causing the liquid phase in said interconnected fermentation zones to be discontinuous from one zone to the next, the bottom of said gas pocket in the upper part of each of said fermentation zones being defined by a restriction means extending partially over the top of said liquid phase in each of said plurality of interconnected fermentation zones, said restricted flow of said gas being sufficient to transfer said fermentable liquid, living cells and products of fermentation by entrainment from the top of each of said fermentation zones to the bottom of the next adjacent fermentation zone, and thereby turbulence in said liquid phase of the fermentation zones is controlled.

2. The process of claim 1 wherein said plurality of fermentation zones are substantially vertically superimposed zones.

3. The process of claim 1 wherein said gas is an oxygen-containing gas supplied from an external source and said living cells are aerobic microorganisms.

4. The process of claim 3 wherein said plurality of fermentation zones are substantially vertically superimposed zones.

5. The process of claim 1 wherein said restriction means extending partially over the top of said liquid phase revolves.

6. The process of claim 1 wherein the cross-sectional area of the interconnections is less than 1.4% of the cross-sectional area of each of said partition members.

7. The process of claim 1 wherein the cross-sectional area of the interconnections is less than 0.5% of the cross-sectional area of each of said partition members.

8. The process of claim 1 wherein the cross-sectional area of the interconnections is less than 0.1% of the cross-sectional area of each of said partition members.

9. The process of claim 4 wherein said aerobic microorganisms are antibiotic-producing microoragnisms and said withdrawn products of fermentation include an antibiotic.

10. The process of claim 9 wherein said antibiotic producing microorganism is a neomycin-producing strain of *Streptomyces fradiae* and said antibiotic is neomycin.

11. A continuous fermentation process for the cultivation of living cells which consists of the steps of continuously supplying a stream of gas and a supply of fermentable liquid to the first of a plurality of interconnected fermentation zones containing living cells capable of fermenting said fermentable liquid, said plurality of fermentation zones being substantially vertically superimposed and interconnected through partition members defining interconenctions which allow only a restricted flow of said gas therethrough, flowing said stream of gas upwards through each of said plurality of fermentation zones in the same direction as the flow of said fermentable liquid and thereafter to the bottom of the next adjacent fermentation zone, whereby products of fermentation are formed in said plurality of fermentation zones, said stream of gas being distributed evenly across the cross-section of the bottom part of each of said fermentation zones by a gas-distribution means positioned above each of said interconnections of said plurality of fermentation zones, said gas-distribution means comprising a revolving restriction means extending partially over said cross-section of the bottom part of each of said fermentation zones and containing radial slots extending inwardly from its periphery, withdrawing said stream of gas and said fermentable liquid containing said products of fermentation from the last of said plurality of fermentation zones, said restricted flow of gas between said interconnected fermentation zones forming a gas pocket in the upper part of each of said fermentation zones thus causing the liquid phase in said interconnected fermentation zones to be discontinuous from one zone to the next, said retricted flow of said gas being sufficient to transfer said fermentable liquid, living cells and products of fermentation by entrainment from the top of each of said fermentation zones to the bottom of the next adjacent fermentation zone.

References Cited

UNITED STATES PATENTS

| | | | |
|---|---|---|---|
| 2,957,810 | 10/1960 | Johnson et al. | 195—80 R |
| 2,635,070 | 4/1953 | Gordon et al. | 195—94 |
| 2,641,564 | 6/1953 | Zobell | 195—109 X |
| 3,310,407 | 3/1967 | Royston | 99—31 |

ALVIN E. TANENHOLTZ, Primary Examiner

U.S. Cl. X.R.

195—141, 142; 99—30, 1.7, 2, 51 A, 51 R, 82, 109, 115